(12) United States Patent
Mitic

(10) Patent No.: US 8,768,059 B2
(45) Date of Patent: *Jul. 1, 2014

(54) SEGMENTATION OF TEXTUAL LINES IN AN IMAGE THAT INCLUDE WESTERN CHARACTERS AND HIEROGLYPHIC CHARACTERS

(71) Applicant: Microsoft Corporation, Redmond, WA (US)

(72) Inventor: Ivan Mitic, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/747,479

(22) Filed: Jan. 23, 2013

(65) Prior Publication Data

US 2013/0136359 A1 May 30, 2013

Related U.S. Application Data

(63) Continuation of application No. 12/751,309, filed on Mar. 31, 2010, now Pat. No. 8,385,652.

(51) Int. Cl.
*G06K 9/34* (2006.01)

(52) U.S. Cl.
USPC ........................................................ 382/177

(58) Field of Classification Search
CPC .......... G06K 9/00416; G06K 9/00442; G06K 9/00469; G06K 9/00859; G06K 9/033; G06K 9/2054; G06K 9/2081; G06K 9/324; G06K 9/325; G06K 9/3275; G06K 9/342; G06K 9/344; G06K 9/346; G06K 9/348; G06K 9/38; G06K 9/40; G06K 9/48; G06K 9/6821; G06K 9/6842; G06K 9/72; G06K 2209/01; G06F 3/018; G06F 17/2863
USPC ......... 382/112, 170–171, 173–174, 176–181, 382/185–186, 190, 224, 226–231, 382/309–310; 715/256
See application file for complete search history.

(56) References Cited

U.S. PATENT DOCUMENTS 6,108,444 A 8/2000 Syeda-Mahmood
6,178,270 B1 1/2001 Taylor et al.
(Continued)

OTHER PUBLICATIONS

Louloudis, et al., "Text Line Detection in Handwritten Documents", Retrieved at <<http://users.iit.demokritos.gr/~bgat/Louloud2008.pdf>>, May 2, 2008, vol. 41, Issue 12, Pattern Recognition, pp. 3758-3772.

Agrawal, Mudit, "Re-Targetable OCR with Intelligent Character Segmentation", Retrieved at <<http://www.cs.umd.edu/Grad/scholarlypapers/papers/MuditAgrawal.pdf>>, Dec. 10, 2007, pp. 26.

(Continued)

*Primary Examiner* — Jose Couso
(74) *Attorney, Agent, or Firm* — Tony Azure; Andrew Sanders; Micky Minhas

(57) ABSTRACT

An image processing apparatus segments Western and hieroglyphic portions of textual lines. The apparatus includes an input component that receives an input image having at least one textual line. The apparatus also includes an inter-character break identifier component that identifies candidate inter-character breaks along a textual line and an inter-character break classifier component. The inter-character break classifier component classifies each of the candidate inter-character breaks as an actual break, a non-break or an indeterminate break based at least in part on the geometrical properties of each respective candidate inter-character break and the bounding boxes adjacent thereto. A character recognition component recognizes the candidate characters based at least in part on a feature set extracted from each respective candidate character that can be histogram features, Gabor features or any other feature set applicable to character recognition. A Western and hieroglyphic text classifier component finds and classifies textual line segments as Western text segments or hieroglyphic text segments and further passes the recognition results to an output component.

20 Claims, 5 Drawing Sheets

(56) References Cited

U.S. PATENT DOCUMENTS

| | | |
|---|---|---|
| 7,236,631 B1 | 6/2007 | Reihani |
| 7,508,984 B2 | 3/2009 | Ohguro |
| 7,801,358 B2 | 9/2010 | Furmaniak et al. |
| 8,385,652 B2 * | 2/2013 | Mitic .................... 382/177 |
| 2004/0117192 A1 | 6/2004 | Miletzki |
| 2005/0027511 A1 | 2/2005 | Ohguro |
| 2005/0276480 A1 | 12/2005 | Li et al. |
| 2008/0008386 A1 | 1/2008 | Anisimovich et al. |
| 2008/0310721 A1 | 12/2008 | Yang et al. |
| 2009/0136135 A1 | 5/2009 | Eom et al. |
| 2010/0067794 A1 | 3/2010 | Barkan et al. |
| 2010/0074525 A1 | 3/2010 | Drory et al. |

OTHER PUBLICATIONS

Qiang Huo, et al., "High Performance Chinese OCR Based on Gabor Features, Discrimination Feature Extraction and Model Training" IEEE 2001 pp. 1517-1520.

Bilan Zhu, et al., "Segmentation of On-Line Handwritten Japanese Text Using SVM for Improving Text Recognition" DAS 2006, LNCS 3872, pp. 208-219, 2006.

Shawn Newsam et al. "Comparing Shape and Texture Features for Pattern Recognition in Simulation Data" SPIE vol. 5672, 2005, pp. 106-117.

International Search Report from Application Serial No. PCT/IB2011/001156, dated Nov. 14, 2011, 9 Pages.

* cited by examiner

本文旨在对自免器的文学原稿作一补充，以展现使用文学及其相关的问题的新题件启示。金文
FIG. 1
*East Asian Text*
The aim of this series is to integrate the personal accounts of
FIG. 2
*Western Text*
16ᵗʰ year(CE 1503) of Ming Xiaozong明朝孝宗, under the masterminding of chief
FIG. 3
*Mix of East Asian and Western Text*
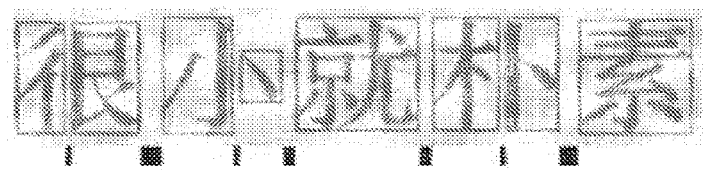
FIG. 5a
*Inter-Character Breaks*
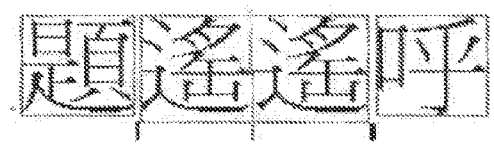
FIG. 5b
*Example of Touching Symbols*

FIG. 6a
*Original Image*
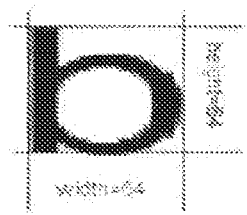
FIG. 6b
*Stretched Image*
FIG. 7
*Character Breaking*

Undecided Points Resolved and Non-Break Points Removed
NOTE: The First Undecided Point has been Removed(Incorrectly)
While the Second has been Selected as Correct Western Word Breaking East Asian Character Breking "Grand" and "Challenge" Recognized as Western Fragments Inter-Word Breaks Around East Asian Character in Non Western Fragments

SEGMENTATION OF TEXTUAL LINES IN AN IMAGE THAT INCLUDE WESTERN CHARACTERS AND HIEROGLYPHIC CHARACTERS

RELATED APPLICATIONS

This application is a continuation of, and claims priority to, U.S. patent application Ser. No. 12/751,309, filed Mar. 31, 2010, and entitled "SEGMENTATION OF TEXTUAL LINES IN AN IMAGE THAT INCLUDE WESTERN CHARACTERS AND HIEROGLYPHIC CHARACTERS." The disclosure of the above-identified application is hereby incorporated by reference in its entirety as if set forth herein in full.

BACKGROUND

Optical character recognition (OCR) is a computer-based translation of an image of text into digital form as machine-editable text, generally in a standard encoding scheme. This process eliminates the need to manually type the document into the computer system. An OCR process typically begins by obtaining an electronic file of a physical document bearing the printed text message and scanning the document with a device such as an optical scanner. Such devices produce an electronic image of the original document. The output image is then supplied to a computer or other processing device and processes the image of the scanned document to differentiate between images and text and determine what letters are represented in the light and dark areas.

As a result of the increasing use of computers and the Internet, coupled with the more frequent usage of English language around the world, it has become common to find textual images that include a combination of Western words and East Asian (e.g., Chinese, Japanese, Korean) text, often in the form of Western Words mixed within a selection of East Asian text. Accordingly, an OCR engine that is to be used with East Asian text should ideally be able to recognize a textual line with a mix of East Asian and Western text.

SUMMARY

In order to support the OCR process, East Asian or hieroglyphic text textual lines with only East Asian text inter-character breaks and individual characters need to be recognized. In addition, for textual lines with both Western and East Asian text the Western and East Asian fragments of text need to be separated from one another and the appropriate text recognition logic needs to be applied to each fragment.

In one implementation, a method and apparatus is provided for performing character recognition on an input image that includes textual lines. The method identifies candidate inter-character breaks along the textual line and classifying each of the candidate inter-character breaks as an actual break, a non-break or an indeterminate break. The inter-character break classification is accomplished based at least in part on the geometrical properties of each respective candidate inter-character break and the character bounding boxes adjacent thereto. The candidate characters are recognized based at least in part on a feature set extracted from each respective candidate character. One particular feature set that may be employed for character recognition is a Gabor feature set.

In another implementation, an image processing apparatus is provided for segmenting Western and hieroglyphic portions of textual lines. The apparatus includes an input component that receives an input image having at least one textual line. The apparatus also includes an inter-character break identifier component that identifies candidate inter-character breaks along a textual line and an inter-character break classifier component. The inter-character break classifier component classifies each of the candidate inter-character breaks as an actual break, a non-break or an indeterminate break based at least in part on the geometrical properties of each respective candidate inter-character break and the character bounding boxes adjacent thereto. A character recognition component recognizes the candidate characters based at least in part on a feature set extracted from each respective candidate character. A Western and hieroglyphic text classifier component segments the textual line into Western text segments or hieroglyphic text segments, and outputs the results to an output component.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 1 and 2 show a textual line of Western and East Asian text, respectively.

FIG. 3 shows a text line that contains a mix of Western and hieroglyphic text.

FIGS. 5a and 5b show examples of characters of East Asian text surrounded by their respective bounding boxes and the candidate inter-character breaks between them.

FIG. 6a shows an image of a character prior to pre-processing along with the width and height of its bounding box; FIG. 6b shows the character after it has been stretched.

FIGS. 7-12 show a textual line as it undergoes the text segmentation process.

DETAILED DESCRIPTION

One important aspect of the optical character recognition (OCR) process is line recognition and segmentation. However, the concept of a line has a different meaning for Western text and East Asian text (or more generally, any hieroglyphic-based in which a single written character represents a word). This distinction can be seen in FIGS. 1 and 2, which show a textual line of Western and East Asian text, respectively. In particular, in the case of a hieroglyphic text line there is only the concept of characters while in a case of a Western text line there is also the concept of words. In other cases, such as those being addressed herein, a text line contains a mix of Western and hieroglyphic text (FIG. 3).

In order to support the OCR process for a mix of Western and East Asian or hieroglyphic text a number of problems need to be addressed. In particular, for textual lines with only East Asian text correct inter-character breaks and individual characters need to be recognized. In addition, for textual lines with both Western and East Asian text the textual line must be properly segmented into Western and East Asian segments of text. Each of these problems will be addressed in turn.

Figure 4:
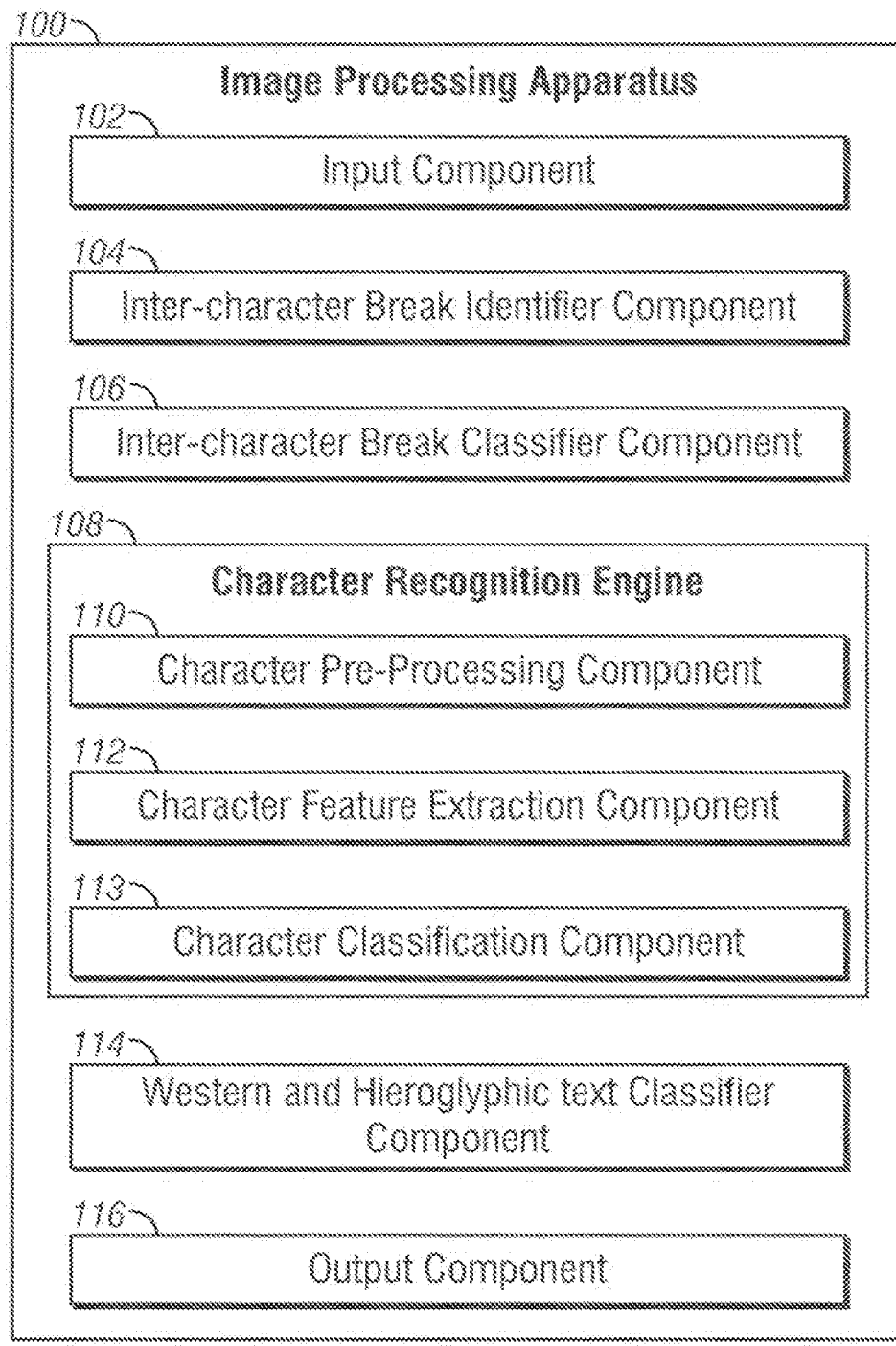
FIG. 4 shows one example of an image processing apparatus that performs the process of segmenting Western and hieroglyphic portions of textual lines.

FIG. 4 shows one example of an image processing apparatus 100 that may perform the process of segmenting Western and hieroglyphic portions of textual lines. The apparatus, which may be incorporated in an OCR engine, can be used by the OCR engine to identify Western and East Asian or other hieroglyphic characters in a textual line. The apparatus includes an input component 102 for receiving an input image that includes at least one textual line. An inter-character break identifier component 104 identifying candidate inter-character breaks along a textual line and an inter-character break classifier component 106 classifies each of the candidate inter-character breaks as an actual break, a non-break or an indeterminate break. The apparatus also includes a character recognition engine 108 for recognizing the candidate characters based at least in part on a feature set extracted from each respective candidate character. The character recognition engine 108 includes a character pre-processing component 110, a character feature extraction component 112 and a character classification component 113. A western and hieroglyphic text classifier component 114 segments textual lines into Western text segments and an East Asian or other hieroglyphic text segments. The apparatus 100 also includes an output component 116 that receives the results from the Western and hieroglyphic text classifier component and generates the information concerning the text-lines in a form that allows it to be employed by subsequent components of the OCR engine.

Each of the aforementioned components will be discussed below.

Inter-Character Breaks

The inter-character break identifier component 104 can identify candidate breaks between East Asian or hieroglyphic characters using well-known vertical projection techniques, which may include techniques for separating symbols that touch one another. FIGS. 5a and 5b show examples of inter-character breaks in East Asian text. Not all candidate inter-character breaks identified in this manner will be true breaks, however. For instance, there may be no clear spatial distinction between individual characters. Conversely, there may appear to be a small spatial distinction within an individual character that may be misidentified as an inter-character break. Accordingly, a method is needed to determine which candidate inter-character breaks are most likely actual inter-character breaks.

Each candidate inter-character break is classified by the inter-character break classifier component 106 as a break point, a non-break point or an indeterminate or undecided point. A break point is an actual break between two characters and a non-break point is located within an individual character. Accordingly, a non-break point is not a true inter-character break. Stated differently, a character cannot span across a break point and a character cannot start or end at a non-break point. However, a character can span across, start at, or end at an indeterminate point.

In order to classify a candidate inter-character break, each candidate's probability is computed and two thresholds are set, one for a break, and one for a non-break. If p(x) is the probability that a candidate x represents an actual break, than if p(x)>BREAK, x will be classified as a break, if p(x)<NON_BREAK, x will be classified as a non-break, and when NON_BREAK<=p(x)<=BREAK the candidate is classified as an undecided point, which can be classified in later stages of the processing.

There are a number of advantages that arise from the use of the aforementioned inter-character break classification scheme. For instance, all inter-character candidate breaks classified as non-breaks are removed in subsequent processing steps, resulting in better performance and accuracy. In addition, all inter-character candidate breaks classified as breaks can only be treated as a point at which a character starts or ends, which also results in better performance and accuracy.

The following terminology will be useful in establishing characteristics or features of inter-character break candidates that may be used to classify them as a break point, a non-break point or an undecided point. These features, including character bounding boxes, may be determined by the inter-character break classifier component 106.

Bi—$i^{th}$ break. Each break is defined with two x coordinates (Bi.start and Bi.end) and Bi.size=Bi.end−Bi.start+1.
BBpi—bounding box preceding i-th inter-character break (the rectangular bounding boxes are visible in FIGS. 5a and 5b)
BBsi—bounding box succeeding i-th inter-character break
BBsi.top and BBsi.bottom—top and bottom coordinates, respectively, of bounding box BBsi
BBpi.top and BBpi.bottom—top and bottom coordinates, respectively, of bounding box BBpi
BBpi.width, BBpi.height—width and height, respectively of bounding box BBpi
BBsi.width, BBps.height—width and height, respectively of bounding box BBsi
MBS—median break size for the given line
ECH—estimated character height for the given line (or median bounding box height if there is no better estimate)
ECW—estimated character width (which can be estimated along with ECH if there is no better estimate)
Bpi—index of preceding break which x coordinate is closest to BBpi.right−ECW
Bsi—index of succeeding break which x coordinate is closest to BBsi.left+ECW Given these definitions, the following characteristics or features may be used by the inter-character break classifier component 106 to classify inter-character candidate breaks as a break point, a non-break point or an undecided point:

TABLE 1

| | |
|---|---|
| f1 | BBpi.width/ECH |
| f2 | BBpi.height/ECH |
| f3 | BBsi.width/ECH |
| f4 | BBsi.height/ECH |
| f5 | BBpi.top/ECH |
| f6 | BBpi.bottom/ECH |
| f7 | BBsi.top/ECH |
| f8 | BBsi.bottom/ECH |
| f9 | Bi.size/MBS |
| f10 | Bi − 1.size/MBS |
| f11 | Bi + 1.size/MBS |
| f12 | (Bi.start − Bpi.start)/ECW |
| f13 | Bpi.size/MBS |
| f14 | (Bsi.start − Bi.start)/ECW |
| f15 | Bsi.size/MBS |

The last four features are used to establish the regularity of East Asian text. In a line that contains only East Asian characters, the character breaks are equidistant from one another. Thus, if there is a break at position x, another break can be expected to be located to the left of the current break at the position x−ECW and to the right of the current break at the position x+ECW. Thus, if there is a break at position x, adjacent breaks can be expected close to the positions x−ECW and x+ECW. Features f12 and f14 represent the measure or degree of this regularity between breaks. Breaks closest to the positions where they are expected are identified and expressed in terms of how well they match with their expected positions. Features f13 and f15 are included for completeness since they provide information about break size.

It should be noted that in those situations where symbols touching one another are divided in order to reproduce a missing break, the break size is equal to 1 (Bi.size=Bi.end−Bi.start+1=1).

The distribution of the above features may be determined using training patterns to establish various combinations of feature values that characterize a break point, a non-break point and an undecided point. Once this has been determined, the values for these features may be used to classify inter-character candidate breaks for a textual line in an unknown image undergoing OCR. While the greatest accuracy will generally be achieved from an examination of all of these features, in some cases an examination of various sub-combinations may be sufficient.

The proposed set of features presented above may be expanded with other similar geometric features to further improve classification accuracy. The expansion process may be accomplished by examining incidents of errors in classification to determine the scenarios when such errors occur.

The inter-character break classifier component 106 can employ any available classification technique (neural networks, decision trees, etc.) to perform the actual classification. Some classifiers will need training using the available feature set before they can be employed. A neural network such as a time delay neural network (TDNN) can be user to further improve the classification accuracy. In this approach, instead of simply using the aforementioned features to classify a particular candidate, the values for a set of features for a few (e.g., 1-3) preceding or successive break points may also be used in the classification process.

Character Recognition

Prior to sending the individual characters identified above to the character feature extraction component 112, some pre-processing is performed on the characters in order to improve accuracy. This step is illustrated in connection with FIGS. 6a and 6b. FIG. 6a shows the image of the original character along with the width and height of its bounding box. In the first step as shown in FIG. 6b, the original character is stretched by the character pre-processing component 108 so that in each dimension it extends to the edge or border of its bounding box, which now has a fixed dimension. In some cases the stretching step may include changing the aspect ratio of the character, in which case the value of the original aspect ratio is retained for future use. One reason for performing the step illustrated in FIG. 6b is to remove inconsistencies between various features of the same character in different fonts.

After the characters have been properly stretched, the next step is to perform feature extraction with character feature extraction component 112. The features that are extracted may be any suitable set of features such as Gabor features or histogram features or any other feature set applicable to character recognition. If Gabor features are used, the feature extraction engine includes a bank of Gabor filters to identify repetitive structures that can be effectively characterized in the frequency domain. Since the OCR engine is based on a grayscale image, this means that instead of using pixel values of 0 or 1 at each pixel position, pixel values between 0 and 255 are used in the formulas for Gabor, histogram or any other features that may be employed. Additionally, a feature normalization step may be performed. For instance, in some examples features may be normalized by their maximum feature value. As previously mentioned, information concerning the original character aspect ratio may have been retained. This information may be added as an extra feature to the feature set that is employed.

After the aforementioned pre-processing step and feature computation step have been performed, character classification component 113 performs classification based on the input feature set received from the Character Feature Extraction component 112. The Character Classification Component 112 can employ any available classification technique (neural networks, decision trees, etc) to perform the actual classification. Some of these classifiers may require training using the available feature set before they can be employed. The character recognition engine 108 outputs a set of character guesses for each candidate character along with a probability for each guess.

Segmentation of Lines into Western and Hieroglyphic Text Segments

Figure 11:
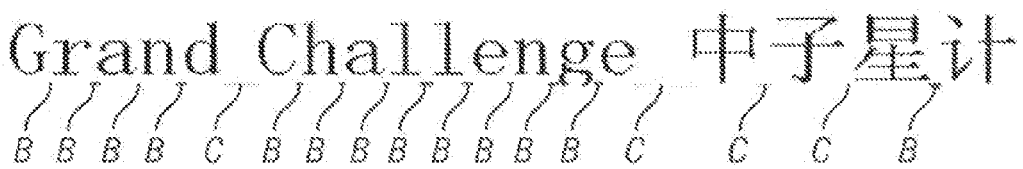
Figure 12:
Figure 13:
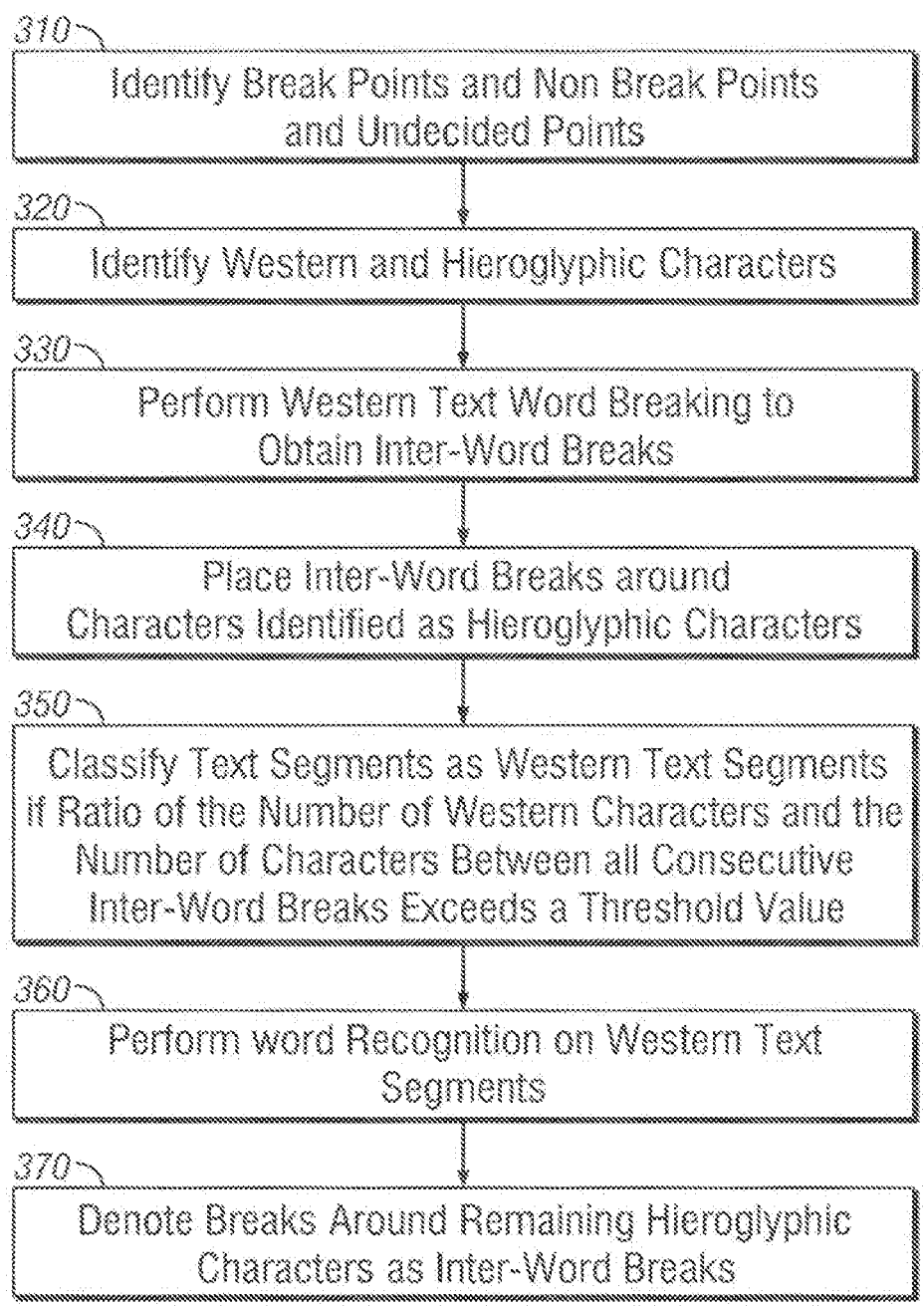
FIG. 13 is a flowchart illustrating one example of a process of dividing textual lines into Western and hieroglyphic text segments.

The process of dividing textual lines into Western and hieroglyphic text segments will be illustrated in connection with the textual line shown in FIGS. 7-12 and the flowchart shown in FIG. 13. First, in step 310, the inter-character break identifier component 104 and the inter-character break classifier component 106 perform the character breaking process described above to identify break points, non-break points and undecided points. Break points are indicated in FIG. 7 by lines B, non-break points by lines N and undecided points by lines U.

Figure 8:
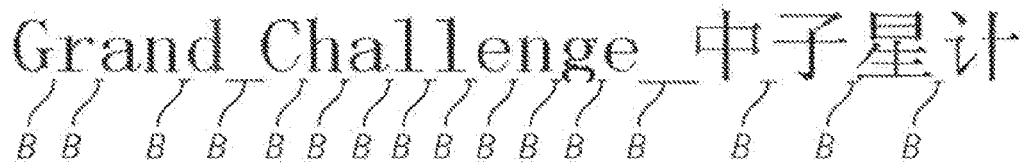
Figure 9:
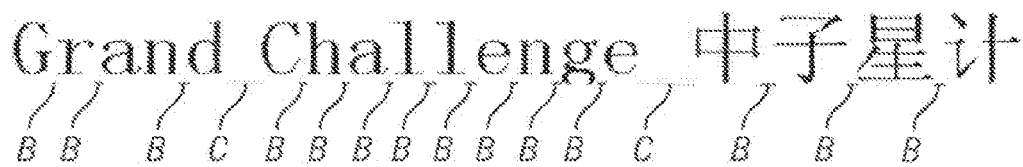

The Western and hieroglyphic text classifier component 114 in step 320 is used to identify the individual characters in the text, both Western and hieroglyphic characters. First, all non-break points are removed. Based on the confidence levels of the individual characters that are computed by the character recognition engine 108, the undecided break points are resolved. The resolution process may be performed by applying the well known Beam search algorithm, which will compute the most optimal sequence of characters between two consecutive break points. As can be seen in FIG. 8, undecided break points have been resolved and non-break points removed. It can be seen that the first undecided break point in FIG. 7 has been incorrectly removed in FIG. 8. At this point in time the sequence of characters has been identified for the given line and their confidence levels specified. In addition, the set of break points has been updated by removing some break points and confirming some others.

The Western and hieroglyphic text classifier component 114 continues the line segmentation process in step 330 by running any of a wide variety of well-known Western word breaking engines to obtain inter-word breaks in the given text line. The inter-word breaks are indicated by lines C in FIG. 9. During the course of this step some of the break points previously identified as inter-character break are now classified as inter-word breaks. From this point on, inter-word breaks will be used to denote the point at which different text segments are separated from one another.

Figure 10:
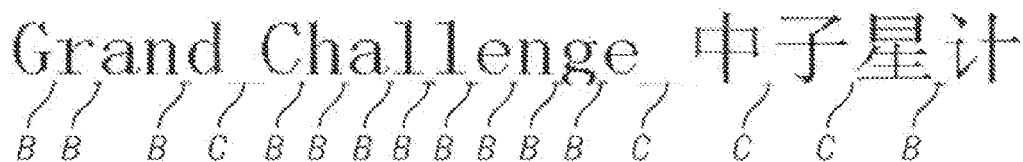

In step 340 the Western and hieroglyphic text classifier component 114 places inter-word breaks around those characters that have been identified in step 320 as hieroglyphic characters with a level of confidence above some threshold. The threshold can be empirically determined. In some implementation inter-word breaks may be placed around some characters that are identified as hieroglyphic characters even if they have a confidence level below the threshold. This can be accomplished by examining some additional character features such as the character height relative to the height of the characters to its left and right, the identity of the characters to its left and right and the height of the character relative to the line height. In this way some additional characters can be identified as hieroglyphic characters, even though they initially had a confidence level below some predefined threshold. FIG. 10 shows inter-word breaks placed around the hieroglyphic characters that satisfy the above-mentioned conditions.

Next, in step 350 the Western and hieroglyphic text classifier component 114 counts the total number of characters N located between all consecutive inter-word breaks as well as the total number of pure Western characters W. If the ratio W/N is greater than some empirically determined threshold this text segment will be classified as a Western text segment, otherwise it will be classified as a hieroglyphic text segment. If a text segment is classified as a Western text segment any of a variety of well-known Western word recognizer engines will be invoked in step 360. If the confidence level for the recognized word provided by the Western word recognizer is lower than some threshold value the text segment will be re-classified as a hieroglyphic text segment. If the confidence level is above the threshold value the text segment will maintain its Western text segment classification. In FIG. 11 the words "Grand" and "Challenge" satisfy this condition and are recognized by the Western word recognizer with a confidence higher than a predefined threshold and, as a result, are classified as Western text segments. It should also be noted that the word "Grand" might be correctly recognized even though there is not break between the characters 'a' and 'n', which means that the Western word recognizer has its own logic for finding inter-character breaks and recognizing individual characters and words. Word recognition results obtained from the word recognizer which are above the previously established threshold are preserved as the final recognition results for the corresponding text segment and later passed to the output component 116.

For the remaining text segments, which are presumably all hieroglyphic text segments, a final segmentation process is performed in step 370 by denoting all breaks around any remaining hieroglyphic characters as inter-word breaks. This step is illustrated in FIG. 12. In this way characters that are between two consecutive inter-word breaks represent a single word, with a string of characters representing Western words in the case of Western text segments and single character words in the case of hieroglyphic text segments.

All recognition results along with the position of inter-word breaks are passed to the output component 116. In case of Western text segments, the results of the Western word recognition process are passed to the output component, while in case of a hieroglyphic text segments the results of the character recognition engine 108 that were resolved in step 320 are passed to the output component.

As used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for performing character recognition on an input image, comprising:
   receiving at an image processing apparatus an input image that includes at least one textual line;
   identifying candidate inter-character breaks along the at least one textual line using the image processing apparatus;
   classifying, using the image processing apparatus, at least one of the candidate inter-character breaks as an actual break, a non-break or an indeterminate break based at least in part on geometrical properties of the at least one candidate inter-character break and character bounding boxes adjacent thereto; and
   recognizing a candidate character using the image processing apparatus based at least in part on a feature set extracted from the candidate character.

2. The method of claim 1 wherein the geometrical properties on which the at least one of the candidate inter-character breaks is classified include a size and location of the adjacent character bounding boxes relative to an estimated character height for the at least one textual line.

3. The method of claim 2 wherein the geometrical properties on which the at least one of the candidate inter-character breaks is classified further include a size of the respective candidate inter-character break and its neighboring breaks relative to an average break size for the at least one textual line.

4. The method of claim 3 wherein the geometrical properties on which the at least one of the candidate inter-character breaks is classified further include a degree of regularity in estimated character widths for the candidate character in the at least one textual line.

5. The method of claim 1 wherein recognizing the candidate character includes performing feature computation using a character feature set and performing classification based on the character feature set by using a classification algorithm.

6. The method of claim 5 wherein the character feature set is a Gabor feature set or a histogram feature set.

7. The method of claim 1 wherein the characters includes Western characters and hieroglyphic characters.

8. A computing device having instructions stored therein for implementing computer-executable components for segmenting Western and hieroglyphic portions of textual lines, wherein the computer-executable components comprise:
   an input component that receives an input image that includes at least one textual line;
   an inter-character break identifier component that identifies one or more candidate inter-character breaks along the at least one textual line;

an inter-character break classifier component that classifies at least one of the one or more candidate inter-character breaks as an actual break, a non-break or an indeterminate break based at least in part on geometrical properties of the at least one of the one or more candidate inter-character breaks and character bounding boxes adjacent thereto;

a character recognition component that recognizes a candidate character based at least in part on a feature set extracted from the candidate character;

a Western and hieroglyphic text classifier component that segments the textual line into Western text segment and hieroglyphic text segment; and an output component that receives line segmentation and recognition results.

9. The computing device of claim 8 wherein the Western and hieroglyphic text classifier component also places inter-word breaks around at least one character that has been recognized as a hieroglyphic character with a confidence level greater than a threshold level.

10. The computing device of claim 9 wherein the Western and hieroglyphic text classifier component also places inter-word breaks around at least one additional character that has been recognized as a hieroglyphic character with a confidence level lower than a threshold level by examining at least one additional character feature.

11. The computing device of claim 10 wherein the additional character features include character height relative to a height of characters to the left and right of the character, an identity of characters to the left and right of the character and a height of the character relative to line height.

12. The computing device of claim 11 wherein the computer-executable components further comprise a Western word recognizer component that recognizes words in the Western text segment.

13. The computing device of claim 12 wherein the Western word recognizer component also provides a Western word recognition result and a confidence level associated therewith, wherein the confidence level represents a probability that recognized words have been recognized correctly and wherein the Western and hieroglyphic text classifier component also reclassifies the Western text segment as a hieroglyphic text segment if the confidence level is below a threshold level.

14. A computing device the computing device having instructions stored therein for performing operations for performing character recognition on an input image, the operations comprising:

receiving at an image processing apparatus an input image that includes at least one textual line;

identifying candidate inter-character breaks along the at least one textual line using the image processing apparatus;

classifying, using the image processing apparatus, at least one of the candidate inter-character breaks as an actual break, a non-break or an indeterminate break based at least in part on geometrical properties of the at least one candidate inter-character break and character bounding boxes adjacent thereto; and recognizing a candidate character using the image processing apparatus based at least in part on a feature set extracted from the candidate character.

15. The computing device of claim 14 wherein the geometrical properties on which the at least one of the candidate inter-character breaks is classified include a size and a location of the adjacent character bounding boxes, the location being relative to an estimated character height for the at least one textual line.

16. The computing device of claim 15 wherein the geometrical properties on which the at least one of the candidate inter-character breaks is classified further include a size of the respective candidate inter-character break and its neighboring breaks relative to an average break size for the at least one textual line.

17. The computing device of claim 16 wherein the geometrical properties on which the at least one of the candidate inter-character breaks is classified further include a degree of regularity in estimated character widths for the candidate character.

18. The computing device of claim 14 wherein recognizing the candidate character includes performing feature computation using a character feature set and performing classification based on the character feature set.

19. The computing device of claim 18 wherein the character feature set is a Gabor feature set.

20. The computing device of claim 14 wherein the characters includes Western characters and hieroglyphic characters.

* * * * *